B. B. NEUTEBOOM.
PROPELLER FOR AIRPLANES.
APPLICATION FILED JUNE 27, 1917.
1,288,136.
Patented Dec. 17, 1918.
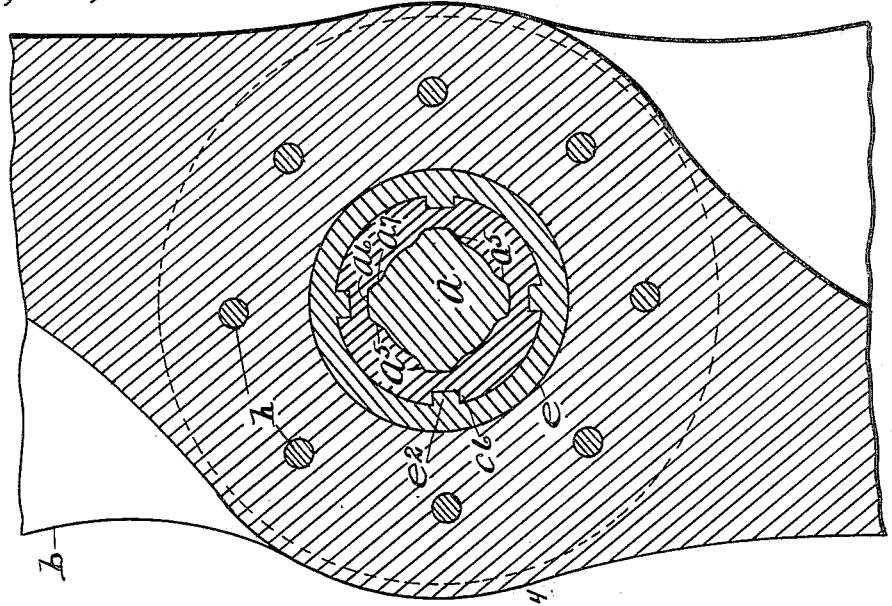
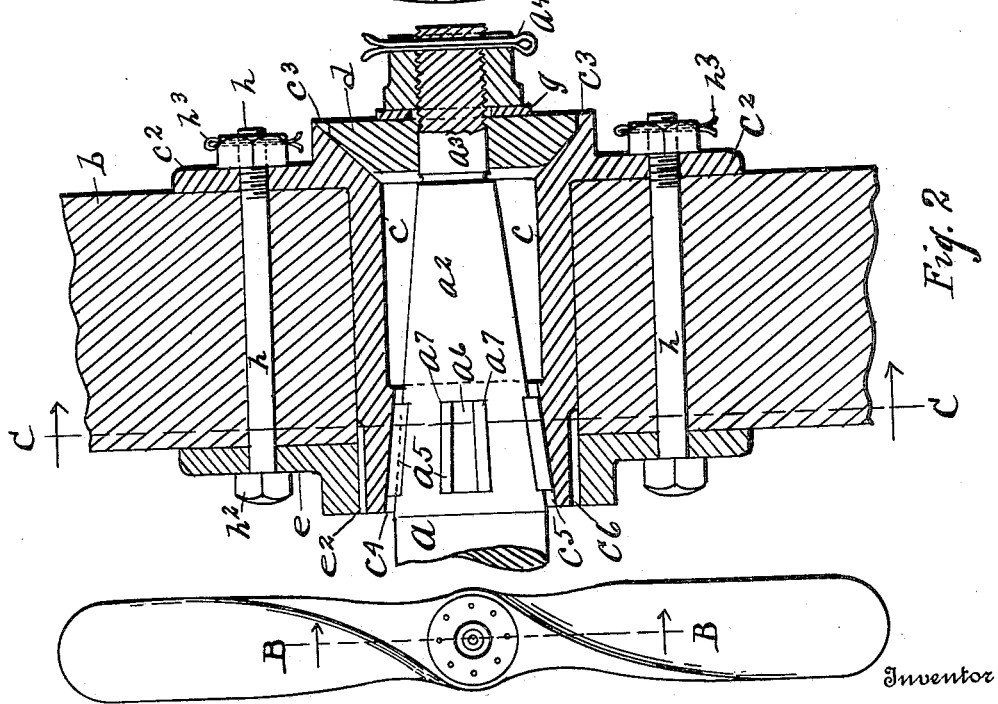
Inventor
BOUDEWIJN B. NEUTEBOOM.
By Ralzemond A. Parker
Attorney

UNITED STATES PATENT OFFICE.

BOUDEWIJN B. NEUTEBOOM, OF DETROIT, MICHIGAN.

PROPELLER FOR AIRPLANES.

1,288,136.

Specification of Letters Patent.

Patented Dec. 17, 1918.

Application filed June 27, 1917. Serial No. 177,207.

*To all whom it may concern:*

Be it known that I, BOUDEWIJN B. NEUTEBOOM, a subject of the Queen of the Netherlands, residing at Detroit, county of Wayne, State of Michigan, have invented a certain new and useful Improvement in Propellers for Airplanes, and declare the following to be a full, clear and exact description of the same, such as will enable others skilled in the art to which it pertains to make and use the same, reference being had to the accompanying drawings, which form a part of this specification.

My invention relates to propellers for airplanes and an object of my improvements is to provide an improved attachment by which the blade is secured to the propeller shaft.

I secure this object in the device illustrated in the accompanying drawing in which;

Figure 1 is an elevation of a propeller for airplanes embodying my invention.

Fig. 2 is a detail section to an enlarged scale on the line B—B Fig. 1.

Fig. 3 is a detail section on the line C—C Fig. 2.

$a$ is the shaft. This has a portion $a^2$ tapering toward its end and beyond this tapering portion toward the end is a short smooth portion $a^3$ and still beyond this is a screw-threaded portion $a^4$.

Near the larger end of the tapering portion $a^2$ of the shaft there are lugs, splines, or projections, $a^5$ which are integral with the shaft and extend outward at intervals from its periphery.

These lugs are of about the proportional length shown. Their outer walls $a^6$ have their surfaces part of a conical surface coaxial with the shaft $a$ and their sides rise from the surface of the conical portion $a^2$ of the shaft and, in cross section, their edges converge toward their outer walls as shown most distinctly in the section of Fig. 3.

$c$ is a hollow metal hub having a cylindrical outer surface at one end on which is the annular outwardly extending flange $c^2$ having its flat inner side wall in a plane at right angles to the axis of the hub. The outer end of the hub $c$ is turned to present the inwardly converging conical surface $c^3$. This may have an angle of about 45 degrees so that the surface will not bind and prevent ready separation of the parts.

The inner end of the hub $c$ is also formed in a conical inwardly converging surface $c^4$ which at this end may be parallel to the surface of the portion $a^2$ of the shaft. There are grooves $c^5$ formed in the surface $c^4$ having a cross section corresponding to the cross section of the lugs or projections $a^5$ that extend from the shaft $a$. These grooves are so shaped that said lugs shall fit accurately and closely therein as to their side walls, which are drawn into close and accurate engagement by the relative longitudinal movement of the hub and shaft.

$d$ is a disk adapted to be sleeved upon the portion $a^3$ of the shaft $a$ and having its periphery shaped in the surface of a cone to fit against the conical surface $c^3$ of the hub $c$. $f$ is a nut adapted to be screwed upon the screw-threaded portion $a^4$ of said shaft. $g$ is a washer interposed between the nut $f$ and the disk $d$.

The hub $c$ is secured to the shaft $a$ by passing it over said shaft so that the conical portion $a^2$ of the shaft near its larger end fits against the conical portion $a^4$ of the hub $c$ and the lugs $a^5$ fit accurately into the grooves $c^6$ in the hub so that their surfaces $a^7$ accurately engage against the corresponding surfaces of said grooves. The disk $d$ is then adjusted to place as shown in Fig. 2 of the drawings, the washer placed in position, and the nut $f$ screwed onto the shaft thus drawing the parts firmly together accurately centering the hub upon the shaft and securing it thereon rigidly so that there shall be no lost motion.

$e$ is a disk having a central aperture adapted to fit over the inner end of the hub $c$. $c^6$ are axially extending grooves in the outer surface of the hub $c$ at its inner end. $e^2$ are lugs, or splines, projecting from the inner surface of the disk $e$ adapted to fit into the grooves $c^6$.

$h$ are bolts extending through bolt-holes in the flange $c^2$ and in the disk $e$ and engaging the latter by means of the heads $h^2$ and the former by nuts $h^3$. The bolts $h$ extend through the middle of the blade $b$ and by means of said bolts the blade is firmly clasped between the flange $c^2$ and the disk $e$.

The blade $b$ is secured upon the hub $c$ by placing it over said hub, as shown in Fig. 2, its central aperture accurately fitting against the cylindrical outer surface of said hub. The disk $e$ is then placed in position over the inner end of the hub $e$, its splines $e^2$ engaging in the grooves $c^6$. The bolts $h$ are then placed in position and firmly screwed up thus clamping the blade between the flange $c^2$ and the disk $e$.

It will be observed that by the above construction the hub is accurately centered upon the shaft and is firmly fixed in position so that there is an extended engaging surface by which the hub is driven from the shaft, that the blade is firmly fixed upon the hub and the force is transmitted to it from the hub from both ends of the latter and that the centrifugal force of the material of the blade is resisted at both ends of the hub.

While the hub is accurately centered upon the shaft because of the conical form of said shaft, in part, still the driving force is transmitted only by the larger part of said shaft and therefore there is less liability of breaking the shaft by twisting.

The engagement of the grooves in the hub with the converging sides of the lugs accurately centers the hub upon the shaft and secures an engagement through which the driving may take place and in which there is not lost motion.

What I claim is:

In an airplane, the combination of a propeller shaft having a conical end, a hub extending over said shaft to the conical portion thereof, lugs extending outward from the periphery of the larger portion only of the conical part of said shaft, said lugs having flaring sides, said hub having a bore adapted to receive the conical portion of said shaft, said bore having grooves in its wall adapted to fit and engage against the flaring sides of said lugs to center said hub upon said shaft and afford engaging surfaces without lost motion, substantially as and for the purpose described.

In testimony whereof, I sign this specification.

BOUDEWIJN B. NEUTEBOOM.